No. 650,654. Patented May 29, 1900.
G. C. POULTON.
SAD IRON CLEANER.
(Application filed Sept. 21, 1899.)
(No Model.)

Witnesses
F. L. Ourand.
George J. Weber.

Inventor
Geo. C. Poulton

UNITED STATES PATENT OFFICE.

GEORGE C. POULTON, OF WASHINGTON, DISTRICT OF COLUMBIA.

SAD-IRON CLEANER.

SPECIFICATION forming part of Letters Patent No. 650,654, dated May 29, 1900.

Application filed September 21, 1899. Serial No. 731,186. (No model.)

*To all whom it may concern:*

Be it known that I, GEORGE C. POULTON, a citizen of the United States, residing at Washington, in the District of Columbia, have invented certain new and useful Improvements in Sad-Iron Cleaners; and I do declare the following to be a full, clear, and exact description of the invention, such as will enable others skilled in the art to which it appertains to make and use the same, reference being had to the accompanying drawings, and to the letters of reference marked thereon, which form a part of this specification.

One object of my invention is to provide a simple and ready means for cleaning the face or rubbing portions of sad-irons that have become rusty or blackened while being heated over a fire composed of different materials; also, for removing starch which adheres to the face portion of the iron, which accumulates or sticks thereto during the ironing of a garment or the like. With my invention these defects are easily and readily obliterated from the face portion of the iron by simply rubbing said face portion on the surface portion of my improved composition or mixture located in a suitably-constructed receptacle or pan, whereby the rubbing or pressing portion of the iron is rendered smooth and ready for use.

A further object of my invention is to utilize the pan or receptacle for housing the face or rubbing portions of the irons when not in use, thereby protecting them from injury or from becoming rusty by exposure to dampness, &c.

Another object of my invention is to provide the pan or receptacle with inwardly-inclined sides, so that the composition or rubbing-surface will be held in the pan, whereby displacement of said composition therefrom is avoided.

The nature of the invention consists in the novel construction and arrangement of parts, as will be hereinafter described, and particularly pointed out in the claims.

Figure 1:
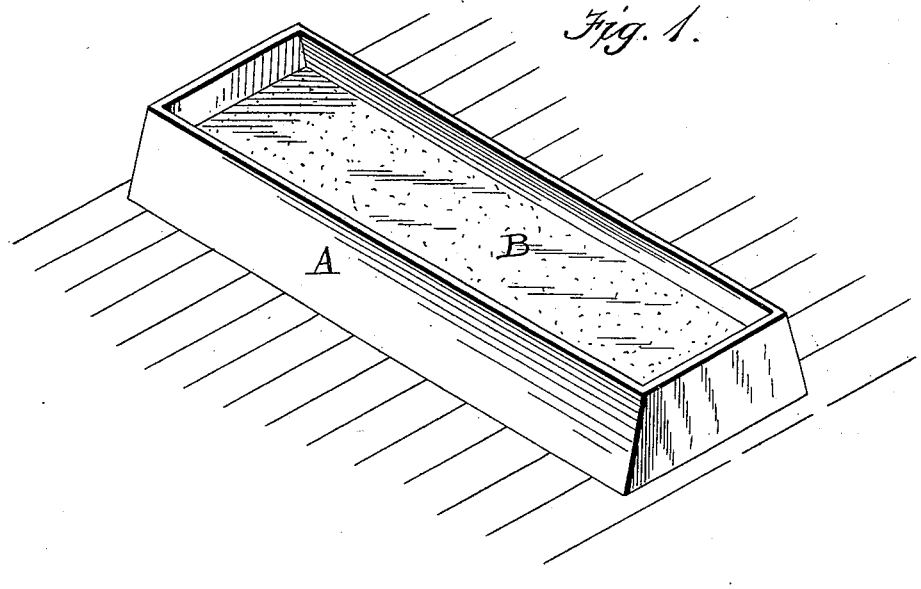
Figure 2:
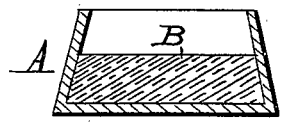

In the accompanying drawings, Figure 1 is a perspective view of my invention, and Fig. 2 is a transverse section of the same.

Referring to the drawings, the letter A designates the pan or receptacle into which is placed my improved composition B, forming the rubbing-surface for cleaning the face portions of sad-irons from impurities or foreign substances which accumulate thereon. The composition comprising the rubbing-surface consists of one part of slaked lime, one part of sand, one part of salt, and two parts of Portland cement, the said parts being thoroughly mixed together with water and poured into the receptacle in a soft state, filling the same to or about midway of its height, as will be seen in Fig. 2, after which the pan is placed in any suitable position for thoroughly hardening the contents thereof. When the composition or mixture becomes stony or hardened, the surface or rubbing portion thereof is saturated or coated over with coal-oil or boiled linseed-oil, thus rendering the implement ready for use.

It will be seen in the drawings that the ends of the receptacle are formed straight and vertical and that the sides thereof are constructed straight and inwardly inclined, so as to prevent the composition in the pan from becoming disengaged therefrom. It will be further seen in the drawings that a space is left between the top of the rubbing-surface of the composition and top edges of the pan to form a receptacle for housing the face portions of the irons when the same are not in use, the said irons being placed crosswise in the pan, with their face or pressing portions in contact with the oily rubbing-surface of the composition.

The operation of cleaning a sad-iron is simple, and is as follows: When an iron for any reason, either before or during the ironing process, requires cleaning, the iron is rubbed gently on the rubbing-surface of the composition until the impurities are removed from the face of the iron, after which the iron is rubbed on a dry cloth, thereby rendering the same ready for use.

I wish it to be understood that I do not confine myself to the precise construction shown in my drawings and heretofore particularly described in my specification, but reserve to myself the right to make alterations and changes therein for the better carrying out of my invention without departing from the essential features or the true principles and scope thereof.

Heretofore pads composed of sheets of paraffin paper or wax have been used for cleaning the face or rubbing portions of sad-irons. Further, soapstone, sandpaper, and asbestos have also been used for the same purpose, and I do not claim such constructions; but
What I do claim is—

1. A receptacle having mounted therein a hardened mass for cleaning sad-irons, the said mass consisting of slaked lime, sand, salt and Portland cement in the proportions described, and the surface portion of said hardened mass being coated over with oil, substantially as specified.

2. In a sad-iron cleaner, the combination with a receptacle or pan having a hardened mass, with an oily top surface mounted therein, said mass extending about midway of the height of the pan whereby a compartment is formed between the said top surface and upper edges of the pan for housing the body portions of the irons, thereby protecting the face or rubbing portions thereof from impurities, substantially as specified.

3. A receptacle or pan for sad-irons consisting of a flat rectangular-shaped bottom portion, having straight and vertical end walls, and straight inwardly-inclined side walls, a rubbing and cleaning composition mounted in said pan and extending about midway of the height of the end and side walls thereof, the said straight inclined side walls preventing the displacement of the said composition, substantially as and for the purpose specified.

In testimony whereof I affix my signature in presence of two witnesses.

GEORGE C. POULTON.

Witnesses:
WM. F. BROWN,
A. N. COFFEY.